United States Patent
Rubner et al.

(10) Patent No.: US 7,196,828 B2
(45) Date of Patent: Mar. 27, 2007

(54) SCANNER HAVING A VERTICAL REST POSITION

(75) Inventors: Karl Heinz Rubner, Dürnau (DE); Bavo Debusschere, Antwerpen (BE)

(73) Assignee: Agfa-Gevaert N.V., Mortsel (BE)

( * ) Notice: Subject to any disclaimer, the term of this patent is extended or adjusted under 35 U.S.C. 154(b) by 892 days.

(21) Appl. No.: 09/907,376

(22) Filed: Jul. 17, 2001

(65) Prior Publication Data
US 2002/0054360 A1    May 9, 2002

Related U.S. Application Data

(60) Provisional application No. 60/266,700, filed on Feb. 5, 2001, provisional application No. 60/238,576, filed on Oct. 6, 2000.

(30) Foreign Application Priority Data

Jul. 17, 2000  (EP) .................. 00202552
Dec. 19, 2000  (EP) .................. 00204669

(51) Int. Cl.
*H04N 1/04* (2006.01)
*G06K 9/22* (2006.01)

(52) U.S. Cl. .................. 358/497; 358/474; 382/315

(58) Field of Classification Search ........... 358/474, 358/497, 494, 498, 505, 473; 382/315, 312, 382/313, 314; 250/363.02; D14/420
See application file for complete search history.

(56) References Cited

U.S. PATENT DOCUMENTS 4,262,281 A * 4/1981 Buckle et al. .............. 382/315
4,611,246 A     9/1986 Nihei
4,684,998 A * 8/1987 Tanioka et al. ............ 358/473
4,750,047 A     6/1988 Kotani et al.
4,777,533 A * 10/1988 Watanabe ................... 358/476
RE33,425 E * 11/1990 Nihei ......................... 358/478
5,067,573 A * 11/1991 Uchida ....................... 345/173
5,165,102 A * 11/1992 Sawyer ....................... 382/315
5,519,511 A * 5/1996 Tanahashi ................... 358/473
5,548,417 A * 8/1996 Sekimoto et al. .......... 358/474
5,550,938 A * 8/1996 Hayakawa et al. ........ 382/313
5,555,105 A * 9/1996 Shahir et al. ............... 358/473
5,602,650 A * 2/1997 Tamura et al. ............. 358/400
5,708,515 A * 1/1998 Nishiura .................... 358/473
5,742,407 A * 4/1998 Albrecht et al. ........... 358/496
5,825,505 A * 10/1998 Toyoda et al. ............. 358/400
5,914,791 A * 6/1999 Lin ............................ 358/498
5,991,468 A * 11/1999 Murakami et al. ........ 382/313
5,995,684 A * 11/1999 Beng et al. ................ 382/312
6,037,954 A * 3/2000 McMahon .................. 345/169
6,040,572 A * 3/2000 Khovaylo et al. ......... 250/235
6,078,407 A * 6/2000 Ma ............................ 358/474
6,088,025 A * 7/2000 Akamine et al. .......... 345/175
6,115,241 A * 9/2000 Hu ............................ 361/683
6,131,522 A * 10/2000 Chavez ...................... 108/90

(Continued)

FOREIGN PATENT DOCUMENTS

EP    0959611 A2    11/1999

*Primary Examiner*—Madeleine AV Nguyen
(74) *Attorney, Agent, or Firm*—Robert A. Sabourin

(57) ABSTRACT

A scanner having a chassis and a body, the body containing a base portion and a document lid. The body is movably connected to the chassis by a connection element, allowing the body to move from a substantially horizontal operative position to a substantially vertical rest position.

9 Claims, 3 Drawing Sheets

U.S. PATENT DOCUMENTS

| | | | |
|---|---|---|---|
| 6,166,830 A * | 12/2000 | Koh et al. | 358/473 |
| 6,271,939 B1 * | 8/2001 | Hu et al. | 358/497 |
| 6,292,272 B1 * | 9/2001 | Okauchi et al. | 358/471 |
| 6,295,390 B1 * | 9/2001 | Kobayashi et al. | 382/313 |
| 6,628,433 B1 * | 9/2003 | Westcott et al. | 358/474 |
| 6,661,539 B1 * | 12/2003 | Nee | 358/474 |
| 6,661,543 B1 * | 12/2003 | Morita | 358/498 |
| 6,704,125 B1 * | 3/2004 | Mui et al. | 357/474 |
| 6,965,862 B2 * | 11/2005 | Schuller | 704/258 |
| 2001/0043377 A1 * | 11/2001 | Hu et al. | 358/505 |
| 2003/0038987 A1 * | 2/2003 | Khovaylo et al. | 358/474 |
| 2005/0029612 A1 * | 2/2005 | Nagasaka et al. | 257/432 |

* cited by examiner

SCANNER HAVING A VERTICAL REST POSITION

This application claims the benefit of U.S. Provisional Application Nos. 60/238,576 filed on Oct. 6, 2000 and No. 60/266,700 filed on Feb. 5, 2001, as well as European patent application Nos. EP 00202552.6 filed on Jul. 17, 2000 and EP 00204669.6 filed on Dec. 19, 2000.

FIELD OF THE INVENTION

The present invention relates to the field of image scanning systems, and in particular to a flatbed desktop scanner.

BACKGROUND OF THE INVENTION

A flatbed desktop scanner as known in the art, such as the Agfa SnapScan™ 1212p, contains a substantially rectangular base portion and a document lid. The base portion rests on the desk. A photo, a printed image or another object is positioned on the base portion, the document lid is closed and the object is scanned. The digital data obtained from the scan can then be processed by a computer, can be printed, can be sent over a network such as the Internet, etc.

A disadvantage of such a conventional scanner is that it requires quite some desk space, even when not in use—very often, a scanner is used only part of the time. Moreover, the scanner is usually connected to a computer that stands on the same desk and this computer often has other peripheral equipment, such as a printer. Such a combination of a computer and its peripheral equipment requires much space, and therefore it is important to save desk space.

OBJECTS OF THE INVENTION

It is therefore an object of the present invention to provide a scanner that requires less desk space.

SUMMARY OF THE INVENTION

The above-mentioned objects are realised by a scanner as claimed in claim 1. The dependent claims set out preferred embodiments of the invention.

FIGS. 1 to 4 illustrate a first embodiment of a scanner 10 in accordance with the invention. As shown in FIG. 4, the scanner 10 contains a chassis 11 and a body 15. The body 15 may contain a base portion 16, to support the document that is to be scanned, and a document lid 17, to cover the document in order to avoid the influence of ambient light during scanning. The body 15 is movably connected to the chassis 11 so that it can be moved from a substantially horizontal operative position, wherein the body 15 is supported by the desk 20 as shown in FIG. 1, to a substantially vertical rest position, as shown in FIG. 2. In the substantially vertical rest position, the scanner requires much less desk space; the gain of desk space can amount to more than 50%, even to more than 60% in a preferred embodiment.

When the scanner 10 is not in use, the body 15 is preferably in its substantially vertical rest position, as shown in FIG. 2. To operate the scanner, the body 15 is then moved from the substantially vertical rest position to the substantially horizontal operative position, which is illustrated by FIG. 1. If no documents have to be scanned for some time, the user preferably returns the body 15 to its substantially vertical rest position, in order to save desk space. Of course, the user may also choose to keep the body 15 in its substantially horizontal operative position for an arbitrary length of time.

In a particular embodiment of the invention, documents may not only be scanned in the substantially horizontal operative position (shown in FIG. 1) but also in the substantially vertical rest position (shown in FIG. 2). In this particular embodiment, the scanner 10 includes means to hold the document in its substantially vertical position, against gravity, while it is scanned. Such holding means may make use of electrostatic attraction—e.g. for paper documents—or other means as known in the art may be used.

Further advantages and embodiments of the present invention will become apparent from the following description and drawings.

BRIEF DESCRIPTION OF THE DRAWINGS

The invention is described with reference to the following drawings without the intention to limit the invention thereto, and in which.

DETAILED DESCRIPTION OF THE INVENTION

Figure 1:
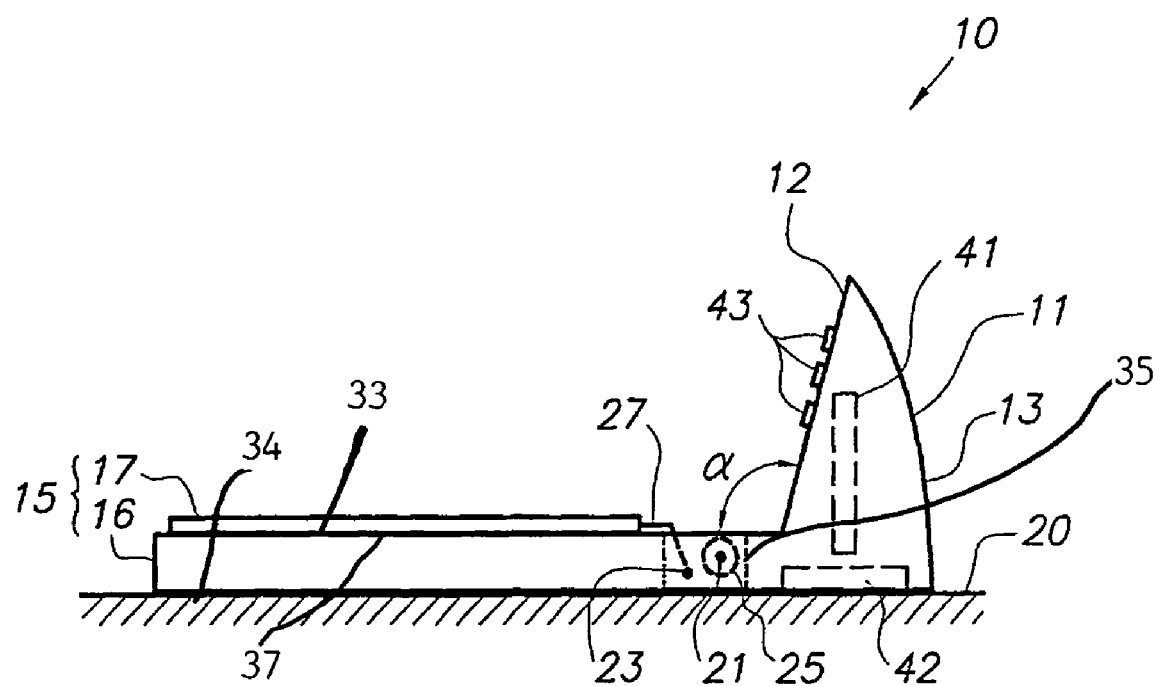
FIG. 1 is a side view of a first embodiment of a scanner in accordance with the invention; the scanner is in its substantially horizontal operative position.
Figure 2:
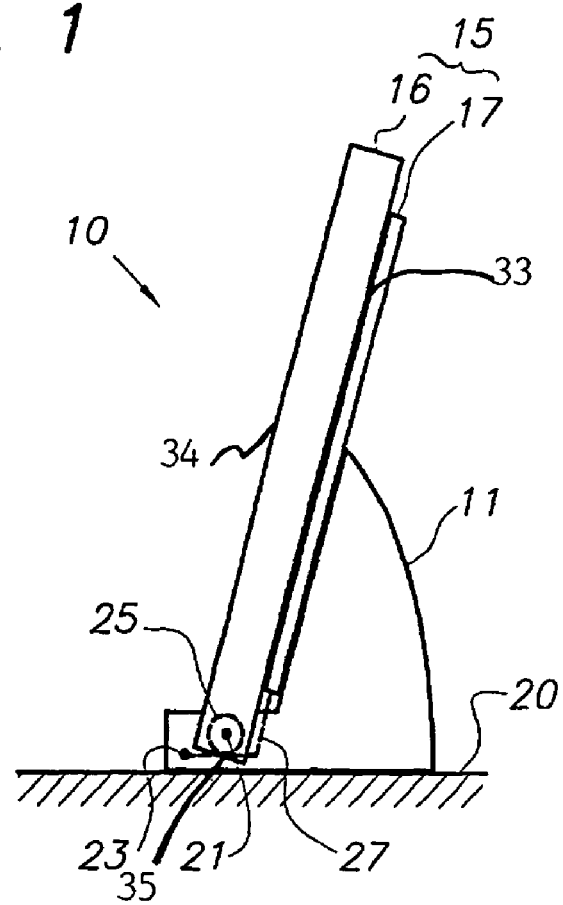
FIG. 2 is a side view of the scanner of FIG. 1 in its substantially vertical rest position.
Figure 3:
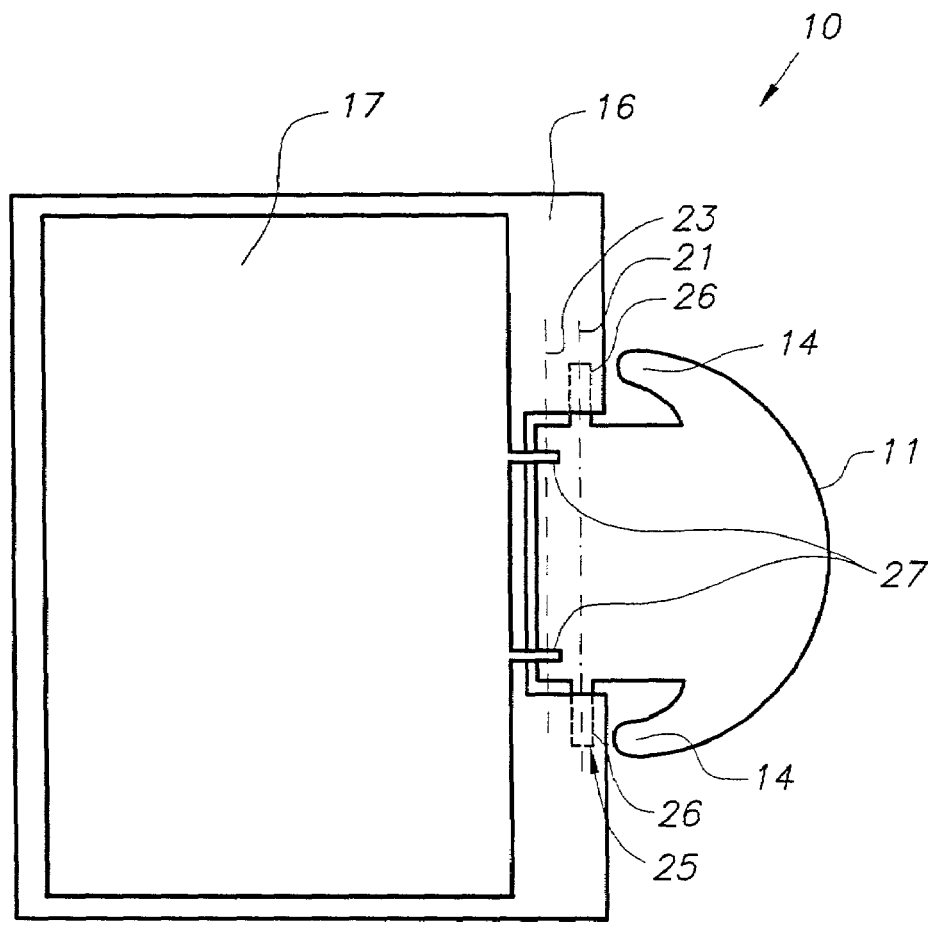
FIG. 3 is a top view of the scanner of FIG. 1 in its substantially horizontal operative position.

In a first embodiment, shown in FIGS. 1 to 3, the base portion 16 is pivotally connected to the chassis 11 by a connector 25, so that the base portion 16 can pivot around axis 21. FIG. 3 shows a specific embodiment of the connector 25: two pins 26, which are part of the chassis 11, and two corresponding openings in the base portion 16. Of course any other connector 25 as known in the art may be used.

In the embodiment of FIGS. 1 to 3, the document lid 17 is pivotally connected to the chassis 11 so that it can pivot around axis 23. The connection is realised in the embodiment of FIGS. 1 to 3 by two elements 27 that have the shape of an oblique L; any other connector as known in the art may be also used.

When moving the body 15 from its substantially horizontal operative position, shown in FIG. 1, to its substantially vertical position, shown in FIG. 2, the base portion 16 pivots around axis 21 and the document lid 17 pivots around axis 23, until both the base portion 16 and the document 17 rest against the chassis 11.

In a preferred embodiment of the invention, axis 23 coincides with axis 21 so that the base portion 16 and the document lid 17 pivot around the same axis. This has the advantage that the document lid 17 does not move with respect to the base portion 16 when moving the body between its substantially horizontal operative position and its substantially vertical rest position.

Figure 5:
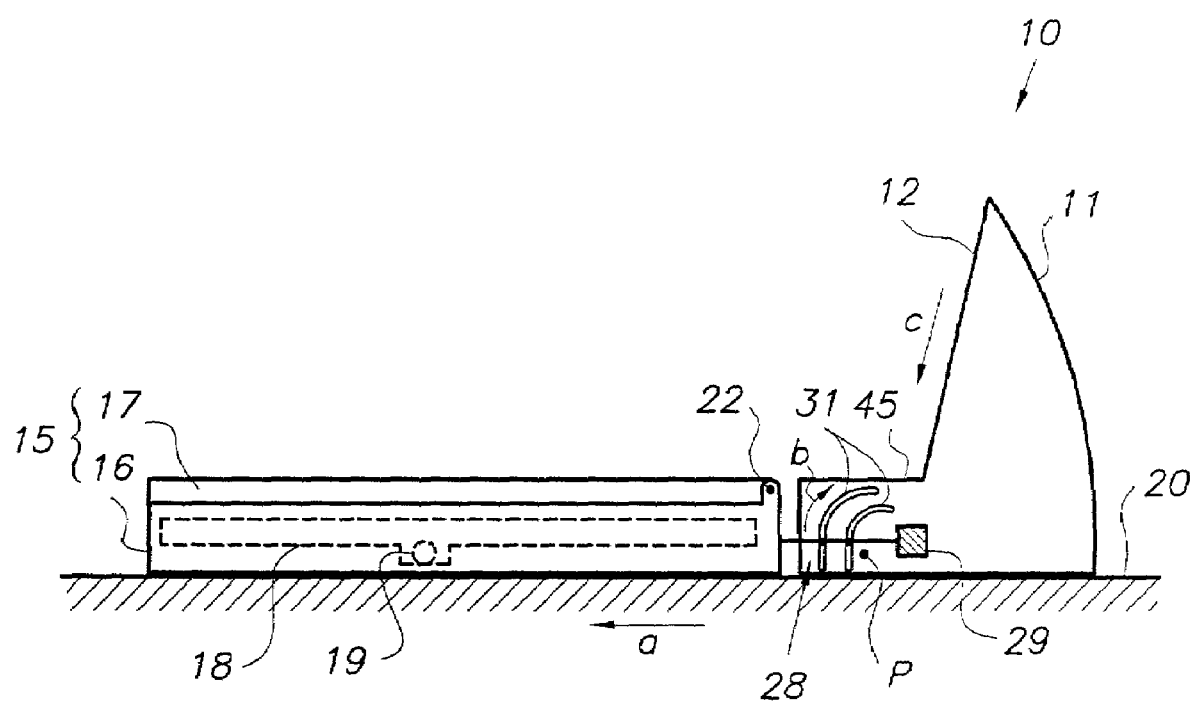
FIG. 5 is a side view of a second embodiment of a scanner in accordance with the invention.

In another embodiment, shown in FIG. 5, the document lid 17 is not connected to the chassis 11 but instead is pivotally connected to the base portion 16, so that it can pivot around an axis 22.

In the substantially vertical rest position, the body 15 makes an angle α with the substantially horizontal plane of the desk 20 that is preferably between 60° and 120°. More preferably, the front side 12 of the chassis 11, which is the side turned towards the body 15, is inclined slightly backwards, as shown in FIG. 1, so that the angle α is between 90° and 120°; most preferably α is between 95° and 115°. Such an angle ensures good stability of the body 15 in the substantially vertical rest position.

It is preferred that the chassis 11 contains at least a portion of the electronic hardware 41 for operating the scanner. This is advantageous since the body 15, not containing this hardware, then weighs less and is therefore easier to move. The chassis 11 may contain the electronics main board and may have, preferably on its back side 13 which is the side turned away from body 15, a connector for both data-transmission and power. The chassis 11 may have two feet 14 to enlarge stability of the scanner 10 in the substantially vertical rest position. Preferably, a weight 42 is put near the bottom of the chassis 11 to enlarge stability even more.

Figure 4:
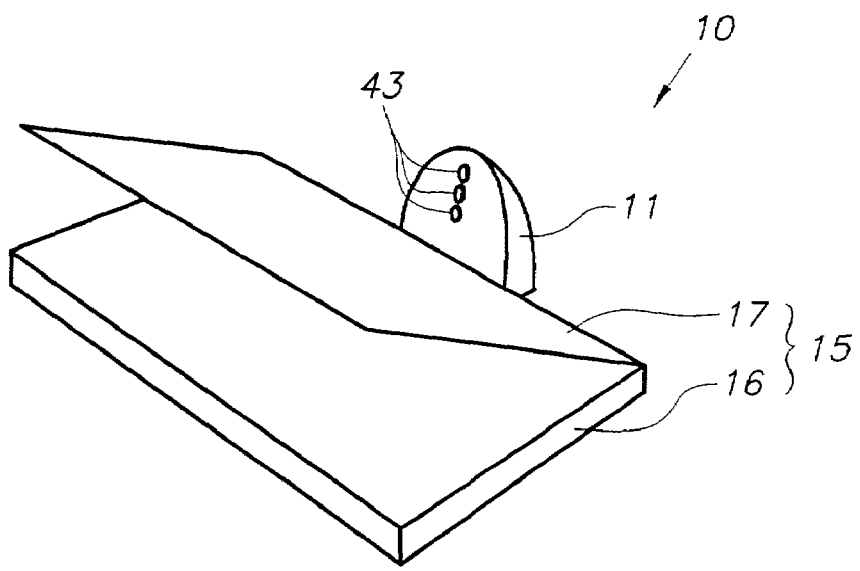
FIG. 4 is a schematic perspective view of a scanner according to the invention.

The user interface of the scanner is preferably contained at least partly in the chassis 11. Advantages are that the user interface is located near the electronic hardware 41, so that the electrical connections between the user interface and the electronic hardware may be short, and that the body 15 may have a simple construction and may weigh less. The user interface may comprise one or more buttons 43, which can be pushed to operate the scanner. As shown in FIGS. 1 and 4, the pushbuttons 43 may be located on the front side 12 of the chassis 11.

The base portion 16 may contain, as known in the art, a scan-carriage, a sensor and a glass plate, upon which the document is put that will be scanned. Preferably, as shown in FIG. 5, the scan-carriage 18 is guided by a single guide rail 19 that occupies a substantially central position in the base portion 16. The document lid 17 preferably has low weight and high stiffness, which can be achieved by known mechanical construction techniques.

FIG. 5 illustrates a second embodiment of the invention wherein the body 15 is not pivotally connected to the chassis 11, as is the case in the first embodiment that was discussed with reference to FIGS. 1 to 3. Instead, as shown schematically in FIG. 5, body 15 is movably connected to chassis 11 by a sliding joint 28 that can itself perform a substantially rotational movement. To move body 15 from its substantially horizontal operative position (shown in FIG. 5) to its substantially vertical rest position, the user may proceed as follows. First he pulls body 15 away from chassis 11 in the sense of arrow a, until stop 29 arrives at position P. Then he lifts body 15 and rotates it in the sense of arrow b until document lid 17 rests against the front side 12 of chassis 11; during this movement, sliding joint 28 may move in a set of grooves 31. Finally, the user may lower body 15 in the sense of arrow c, so that body 15 rests against face 45 of chassis 11.

Having described in detail preferred embodiments of the current invention, it will now be apparent to those skilled in the art that numerous modifications can be made therein without departing from the scope of the invention as defined in the appending claims.

LIST OF REFERENCE SIGNS FOR THE DRAWINGS

10: scanner
11: chassis
12: front side
13: back side
14: foot
15: body
16: base portion
17: document lid
18: scan-carriage
19: guide rail
20: desk
21: first axis
22: second axis
23: third axis
25: connection element
26: pin
27: connection element
28: sliding joint
29: stop
31: groove
41: electronic hardware
42: weight
43: pushbutton
45: face
α: angle
P: position
a, b, c: arrows

What is claimed is:

1. A scanner comprising:
   a chassis comprising a bottom for support during both scanning and non-scanning on a substantially horizontal surface, and a front side positioned at an angle greater than 95 degrees from the horizontal surface;
   a body comprising
      a base portion having a top surface for supporting a document to be scanned, a bottom surface for supporting the base portion on the substantially horizontal surface during scanning, a side surface for supporting the base portion on the chassis during non-scanning, and a lid for covering the document during scanning; and;
   a connector connecting the chassis and the body along a pivotal axis for allowing the body to be pivoted so that the bottom surface of the base portion is supported by the horizontal surface during scanning, and for allowing the body to be pivoted so that, when the scanner is non-scanning and at rest, the top surface is adjacent to and supported by the front side of the chassis and the side surface is supporting the base portion on the chassis.

2. The scanner according to claim 1 wherein the body is pivotally connected to the chassis for pivoting around a first axis.

3. The scanner of claim 2 wherein the lid is pivotally connected to the base portion for pivoting around a second axis.

4. The scanner according to claim 3 wherein the first axis and the second axis are the same.

5. The scanner of claim 1, wherein the body further comprises a scan-carriage, sensor and glass plate.

6. The scanner according to claim 1, wherein said angle is between 95 degrees and 120 degrees with respect to said substantially horizontal surface.

7. The scanner according to claim 1 wherein the chassis comprises electronic hardware for operating the scanner.

8. The scanner according to claim 1 wherein the scanner has a user interface and wherein the chassis comprises at least a portion of the user interface.

9. The scanner according to claim 8 wherein the user interface comprises at least one pushbutton.

* * * * *